(12) United States Patent
Inoue et al.

(10) Patent No.: US 6,409,951 B1
(45) Date of Patent: Jun. 25, 2002

(54) PROCESS FOR PRODUCING AN INORGANIC MOLDED PRODUCT

(75) Inventors: Akira Inoue; Seitaro Onoue, both of Tokyo (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 0 days.

(21) Appl. No.: 09/538,303

(22) Filed: Mar. 30, 2000

(30) Foreign Application Priority Data

Mar. 31, 1999 (JP) .............................. 11-91057
Feb. 16, 2000 (JP) .......................... 2000-38398

(51) Int. Cl.$^7$ ................................. S29C 59/00

(52) U.S. Cl. ....................... 264/122; 264/109; 264/333; 106/690; 106/691; 366/7

(58) Field of Search ................................ 264/109, 122, 264/333; 106/690, 691; 366/7

(56) References Cited

U.S. PATENT DOCUMENTS

| | | | |
|---|---|---|---|
| 4,084,982 A | | 4/1978 | Prior et al. |
| 4,111,705 A | * | 9/1978 | Junovich et al. ............. 106/691 |
| 4,780,141 A | * | 10/1988 | Double et al. .............. 106/691 |
| 4,786,328 A | * | 11/1988 | Weill et al. .................. 106/691 |
| 4,872,912 A | * | 10/1989 | Barrall et al. ................ 106/691 |
| 5,382,289 A | | 1/1995 | Bambauer et al. |
| 5,403,519 A | | 4/1995 | Rittler |
| 5,595,597 A | * | 1/1997 | Fogel et al. ................. 106/691 |

FOREIGN PATENT DOCUMENTS

| | | |
|---|---|---|
| EP | 0 758 676 | 2/1997 |
| GB | 1 341 647 | 12/1973 |
| JP | 47-002424 | 2/1972 |
| JP | 51-002727 | 1/1976 |
| JP | 55-051768 | 4/1980 |
| JP | 55-095667 | 7/1980 |
| JP | 59-003958 | 1/1984 |
| JP | 60-228142 | 11/1985 |
| JP | 61-058420 | 12/1986 |
| JP | 4-317403 | 11/1992 |

OTHER PUBLICATIONS

Database WPI, AN 1986–026776 (04), SU 1 165 697, Jul. 7, 1985.
Database WPI, AN 1997–433449, RU 2 074 148, Feb. 27, 1997.

* cited by examiner

Primary Examiner—Jan H. Silbaugh
Assistant Examiner—Adam R. Harris
(74) Attorney, Agent, or Firm—Oblon, Spivak, McClelland, Maier & Neustadt, P.C.

(57) ABSTRACT

A process for producing an inorganic molded product, which comprises a step of preparing a hardenable composition comprising 100 parts by mass of an acid metal phosphate, from 80 to 200 parts by mass of its hardener, and from 0.1 to 10 parts by mass of urea, a step of combining 100 parts by mass of the hardenable composition and from 5 to 100 parts by mass of an inorganic reinforcing material to obtain a molding material, a step of molding the molding material into a desired shape to obtain a semi-rigid material, and a step of heating the semi-rigid material at a temperature of at least 120° C. to complete hardening.

6 Claims, No Drawings

PROCESS FOR PRODUCING AN INORGANIC MOLDED PRODUCT

The present invention relates to a process for producing an inorganic molded product which is suitable for use, for example, as a building material or an industrial structural material or member. Particularly, it relates to a process for producing an inorganic molded product which is excellent in strength, water resistance, thermal shock resistance and dimensional stability as compared with conventional inorganic material such as cement material or calcium silicate material.

Heretofore, cement plates, calcium silicate plates, etc. are widely used as building materials or as structural materials or members in an application where non-combustibility is required. However, cement materials and calcium silicate materials contain hydration water, since water is involved in hardening these materials. Accordingly, if such cement materials and calcium silicate materials are exposed to a high temperature of a level where the hydration water evaporates, cracks may form, whereby the dimension may substantially change, and the strength may remarkably decrease.

As an inorganic material which is durable at such a high temperature, a hardenable composition comprising phosphoric acid and/or a phosphate and various metal compounds, or an inorganic material obtained by hardening such a hardenable composition, has been proposed. Further, various molded products, structural materials and building materials having such inorganic materials reinforced by reinforcing materials, have been proposed.

For Example, JP-A-47-2424 proposes a semi-rigid heat insulating refractory comprising neutral magnesium phosphate, an alkaline earth metal oxide, silica, acid oxides other than silica and inorganic fibers and having a density of at most 0.9 g/cc, a melting point of at least 1500° C. and a working temperature limit of at least 1200° C.

Further, JP-A-51-2727 proposes a process for producing an inorganic building material plate, wherein a green plate obtained by mixing cement with a reinforcing material, a filler, etc., followed by sheeting, is coated with a composition obtained by mixing and reacting three components i.e. phosphoric acid and/or a phosphate, aluminum and/or an aluminum compound and a Group IIA metal and/or a Group IIA metal compound, by itself or together with a proper amount of water, and the plate is then cured.

Further, JP-A-55-51768 proposes an inorganic composition for low temperature burning, which is prepared by incorporating a reinforcing material durable against a burning temperature with an upper limit of 750° C., to an inorganic molding material made of a mixture comprising (a) a natural matter or composition, or glass, containing alumina, silica or both as the main component, and (b) phosphoric acid or its salt. As such a reinforcing material, glass fibers, rock wool, metallic fibers, carbon fibers and mixtures thereof, are mentioned.

Further, JP-A-55-95667 proposes a construction material comprising a glass fiber-reinforcing material, a copper-chromium-phosphate binder or an aluminum-chromium-phosphate binder and a powder mixture of kaolin and a magnesium-containing inorganic extender, as a neutral active doping agent.

Further, JP-B-59-3958 discloses a process for producing a pliable, inorganic, non-combustible molded product, wherein an aqueous slurry mixture prepared by mixing proper amounts of a quick-acting hardener and a slow-acting hardener to an inorganic film forming agent as the main agent, is impregnated in and coated on a shaped fibrous base material such as paper, woven fabric, non-woven fabric or a mat, and then hardened. As the inorganic film forming agent, a metal phosphate such as aluminum phosphate or aluminum polyphosphate, is disclosed. As the hardener, magnesium oxide, zinc oxide, aluminum hydroxide, calcium hydroxide or calcium silicate, is, for example, mentioned. As the fibrous base material, glass fibers are, for example, disclosed.

Further, JP-A-60-228142 proposes a bonded composite structure comprising at least one layer of at least one type of layer forming material, each layer of the layer forming material being bonded to an adjacent layer by a water resistant phosphate adhesive material obtained by a reaction of a composition comprising a metal oxide, calcium silicate and phosphoric acid. As examples of the layer forming material, woven fabric, non-woven fabric and chopped glass fibers are mentioned.

Further, JP-B-61-58420 discloses a method for producing a filled inorganic plastic cement, which comprises mixing a microfiber filler to a reactive aqueous slurry comprising a magnesium salt, a water-soluble phosphate component and magnesium oxide and having a viscosity of from about 700 to 15000 cps, in an amount of from 2 to 40% by weight of the slurry.

With the hardenable compositions of the above mentioned prior art comprising phosphoric acid and/or a phosphate and various metal compounds, the reaction of phosphoric acid or a phosphate with the metal compound as its hardener, starts and proceeds immediately after the preparation of the compositions. Accordingly, depending upon the type of the hardener, the pot life of the hardenable composition may sometimes be shortened. Further, it may happen that as the time passes after the preparation, gelation of the hardenable composition proceeds, and its viscosity tends to be high, whereby when the hardenable composition is combined with a fibrous reinforcing material, impregnation of the composition to the reinforcing material tends to be inadequate, and the mechanical strength of a molded product obtained by hardening the hardenable composition, tends to be low.

As is different from a hydraulic cement material or calcium silicate material, in the process of hardening of the above hardenable composition, most water required for the composition to flow at the time of molding into a desired shape, will not contribute to the hardening of the composition and will be discharged as excess water. In such a case, water present at the surface or in the vicinity of the surface of the hardenable composition will be discharged relatively easily without bringing about defects such as voids to the structure of the resulting molded product.

However, in a case where the reaction or hardening of the hardenable composition is quick, only the surface portion may firstly be hardened before the internal water will be discharged by evaporation, and water tends to remain in the interior of the composition. In order to complete the reaction and hardening of the hardenable composition, heating is required, and even if the water remaining in the interior will be evaporated by this heating, it will hardly be discharged, and the evaporated water is likely to form bubbles which in turn may form voids in the interior of the composition, expand the composition which is not yet completely hardened or cause cracking, thus leading to deterioration of the appearance or mechanical strength of the molded product.

For the purpose of solving the above problems by suppressing the reaction of phosphoric acid or a phosphate with various metal compounds in the hardenable composition or improving the working efficiency or moldability during the production of a molded product, JP-A-4-317403 proposes to incorporate an organic liquid buffer to a hardenable composition, and as such an organic liquid buffer, a carboxylic acid, an amine or urea is, for example, mentioned.

However, the carboxylic acid or the amine to be used as the organic liquid buffer in the technique disclosed in JP-A-4-317403, will not evaporate or decompose by the heating to complete the hardening of the hardenable composition, and accordingly, it will remain in the hardened composition i.e. in the interior of the molded product. If the carboxylic acid remains in the interior of the molded product, there will be a problem that the water resistance of the molded product tends to be low. Further, if the amine will remain in the interior of the molded product, there will be a problem that when the molded product is exposed to a high temperature at a level of e.g. at least 400° C., the carbonized amine will remain in the interior of the molded product, whereby the strength of the molded product tends to remarkably decrease, although the reason for the decrease is not clearly understood, whereby the heat resistance which the molded product should have, will be impaired. Further, in the hardenable composition disclosed in JP-A-4-317403, from 0.25 to 1 mol of the organic liquid buffer is incorporated to 1 mol of phosphoric acid, and if this molar ratio is converted to a weight ratio for every type of the organic liquid buffer, it corresponds to an incorporation of from 15 to 155 parts by weight of the organic liquid buffer to 100 parts by weight of phosphoric acid (as calculated with a concentration of 100%). If such a large amount of the organic liquid buffer is used relative to phosphoric acid, the organic substance will remain in a substantial amount in the resulting molded product, whereby there will be a problem that the heat resistance of the molded product tends to be low.

Further, if urea is used in the above mentioned proportion as the organic liquid buffer, the amount of ammonia or carbon dioxide to be formed by the decomposition of urea at the time of heating for hardening the hardenable composition, will be large, thus leading to a problem that voids will be formed in the molded product, and the mechanical strength of the molded products will be low.

Accordingly, it is an object of the present invention to provide a process for producing an inorganic molded product which has high strength and excellent water resistance, heat resistance, thermal shock resistance and dimensional stability.

To accomplish the above object, the present invention provides a process for producing an inorganic molded product, which comprises a step of preparing a hardenable composition comprising 100 parts by mass of an acid metal phosphate, from 80 to 200 parts by mass of its hardener, and from 0.1 to 10 parts by mass of urea, a step of combining 100 parts by mass of the hardenable composition and from 5 to 100 parts by mass of an inorganic reinforcing material to obtain a molding material, a step of molding the molding material into a desired shape to obtain a semi-rigid material, and a step of heating the semi-rigid material at a temperature of at least 120° C. to complete hardening.

In a preferred embodiment of the present invention, it is preferred that the process further includes a step of adjusting the water content of the molding material to be from 5 to 10 mass % before molding it into a desired shape.

Further, it is preferred that the hardener is at least one member selected from the group consisting of a metal hydroxide, a basic metal oxide and a complex metal oxide containing a basic metal oxide as a component, and it contains one having an average particle size of at most 5 $\mu$m in an amount of at least 30 mass % of the entire hardener.

Further, it is preferred that the hardener is at least one member selected from the group consisting of a metal hydroxide, a basic metal oxide and a complex metal oxide containing a basic metal oxide as a component, and it contains one having an average particle size of at least 20 $\mu$m in an amount of from 0.1 to 10 mass % of the entire hardener.

Further, it is preferred that the inorganic reinforcing material is inorganic fibers or whiskers.

Still further, it is preferred that the inorganic fibers are glass fibers or carbon fibers having a surface treating agent containing an epoxy resin applied thereto.

According to the process for producing an inorganic molded product of the present invention, urea is added to a hardenable composition comprising an acid metal phosphate and its hardener, whereby it is possible to suppress the reaction of the acid metal phosphate with its hardener and to control an increase of the viscosity of the composition, so that impregnation of the hardenable composition to inorganic fibers among inorganic reinforcing materials, will be facilitated and improved, and thus the mechanical strength of the resulting molded product will not be low.

Further, as the reaction of the acid metal phosphate with its hardener is suppressed by urea, there will be no substantial difference in the degree of reaction between the surface and the interior of the composition at the time of hardening the hardenable composition by heating, and it will not occur that only the surface portion hardens first. Accordingly, internal water vaporized by heating will readily be released out of the composition, whereby it is possible to avoid such a possibility that cracking takes place during hardening of the composition or voids will form in the interior of the resulting molded product.

Further, in the present invention, a molding material obtained by combining the hardenable composition and an inorganic reinforcing material is molded into a desired shape to obtain a semi-rigid material, and the semi-rigid material is heated at a temperature of at least 120° C. to complete hardening, whereby urea incorporated to the hardenable composition will not remain in the resulting molded product, since it will be decomposed into ammonia and carbon dioxide at that temperature and will be released to the exterior. Accordingly, a possibility can be avoided such that as in the case where a carboxylic acid or an amine is used as a component for suppressing the reaction of the composition, the component will remain and present an adverse effect to the molded product. Further, as a part of ammonia formed by the decomposition of urea will be captured by the acid metal phosphate, the heat resistance and water resistance of the resulting molded product will be improved.

Further, in the present invention, urea is used in an amount of from 0.1 to 10 parts by mass to 100 parts by mass of the acid metal phosphate. Thus, the ratio of urea is relatively small, whereby the amounts of ammonia and carbon dioxide to be formed by decomposition of urea at the time of heating the semi-rigid material are small, whereby voids will not be formed in the resulting molded product, and there will be no deterioration in the strength of the molded product.

Further, by combining the hardenable composition and the inorganic reinforcing material in the above mentioned specific proportions, it is possible to impart excellent mechanical strength, water resistance, heat resistance and dimensional stability as compared with conventional products, whereby the molded product of the present invention will be useful for building materials or various industrial structural materials or members which are required to have heat resistance.

In a preferred embodiment of the present invention, the process includes a step of adjusting the water content of the molding material to be from 5 to 10 mass % before molding it into a desired shape, whereby the handling efficiency of the molding material will be improved, and in the subsequent step, expansion of a molded product due to abrupt vaporization of water, can be avoided.

Further, if the hardener contains at least one member selected from the group consisting of a metal hydroxide, a basic metal oxide and a complex metal oxide containing a basic metal oxide as a component, and having an average particle size of at most 5 μm, in an amount of at least 30 mass % of the entire hardener, the matrix of the resulting molded product will be dense, and the mechanical strength of the molded product will be high.

Still further, if the hardener contains at least one member selected from the group consisting of a metal hydroxide, a basic metal oxide and a complex metal oxide containing a basic metal oxide as a component, and having an average particle size of at least 20 μm, in an amount of from 0.1 to 10 mass % of the entire hardener, when water contained in the hardenable composition is evaporated, it will be readily released, so that formation of voids in the molded product can be avoided.

Now, the present invention will be described in detail. In the following description, "parts" means "parts by mass", and "%" means "mass %", unless otherwise specified.

In the present invention, the hardenable composition comprises an acid metal phosphate, its hardener, urea and other components in the predetermined proportions. Further, in the present invention, the matrix means mainly the portion where the acid metal phosphate and its hardener are reacted and hardened and means the portion excluding an inorganic reinforcing material.

The acid metal phosphate to be used in the present invention is a metal phosphate having at least one hydroxyl group bonded to a phosphorus atom and is a general term for a metal primary phosphate (a metal dihydrogenphosphate), a metal sesquiphosphate and a metal secondary phosphate (a metal hydrogenphosphate). As a metal primary phosphate, aluminum primary phosphate, magnesium primary phosphate or zinc primary phosphate is, for example, preferably employed. Among them, it is particularly preferred to employ aluminum primary phosphate in view of the solubility in water and economical efficiency. Aluminum primary phosphate is commercially available not only in the form of an aqueous solution but also in a solid form, and by a combination of the aqueous solution and the solid product, adjustment of the water content prior to hardening of the hardenable composition will be easy.

Further, as a metal sesquiphosphate, aluminum sesquiphosphate may be employed, and as a metal secondary phosphate, aluminum secondary phosphate or iron secondary phosphate may, for example, be employed. Such a metal sesquiphosphate or a metal secondary phosphate is poor in the solubility in water as is different from the metal primary phosphate. Accordingly, it is preferred to employ such a metal sesquiphosphate or a metal secondary phosphate in the form of an aqueous dispersion containing it as dispersed in water.

The above mentioned acid metal phosphate is preferably employed in the form of an aqueous solution or aqueous dispersion having a solid content concentration of from 40 to 90%, more preferably from 50 to 70%, whereby the fluidity at the time of molding the hardenable composition will be good, and the structure of the resulting molded product can be made dense. Further, as mentioned above, the acid metal phosphate includes various types, from which one or a combination of two or more may be selected for use.

In the present invention, as the hardener for the above acid metal phosphate, a metal compound such as a metal hydroxide, a basic metal oxide, a complex oxide containing a basic metal oxide as a component, or a hydrated metal chloride, which will be exemplified hereinafter, may be used. Among them, one or a combination of two or more may be selected for use. When mixed and heated with the acid metal phosphate, such a hardener will react and harden with the phosphate to form a matrix of an inorganic molded product.

The metal hydroxide may, for example, be aluminum hydroxide, calcium hydroxide or magnesium hydroxide. The basic metal oxide may, for example, be aluminum oxide, magnesium oxide, zinc oxide or calcium oxide. The complex oxide containing a basic metal oxide as a component, may, for example, be calcium silicate (wollastonite), calcium aluminate (alumina cement), kaolinite, cordierite ($2MgO.2Al_2O_3.5SiO_2$), magnesite or talc. The hydrated metal chloride may, for example, be hydrated aluminum chloride, polyaluminum chloride or magnesium chloride hexahydrate.

The above hardener is used in an amount of from 80 to 200 parts per 100 parts (as a solid content) of the acid metal phosphate. If the amount of the hardener is less than 80 parts, the acid metal phosphate tends to remain in the inorganic molded product obtainable by molding, heating and hardening of the hardenable composition, whereby not only no adequate mechanical strength will be obtained, but also the water resistance of the molded product tends to be impaired. On the other hand, if the amount of the hardener exceeds 200 parts, the proportion of the acid metal phosphate to the hardener tends to be small, whereby the matrix of the molded product tends to be coarse, and no adequate mechanical strength tends to be obtained. It is more preferred to use from 100 to 180 parts of the above hardener per 100 parts of the acid metal phosphate.

In a case where a metal hydroxide, a basic metal oxide or a complex oxide containing a basic metal oxide as a component is employed among the above mentioned hardeners, it is preferred that one having an average particle size of at most 5 μm is contained in an amount of at least 30% of the entire hardener. When the hardener having an average particle size at most 5 μm is contained in an amount of at least 30%, the matrix of the resulting molded product tends to be dense, whereby bonding of the reinforcing material and the matrix will be good, whereby the mechanical strength of the molded product will be good. However, if the hardener having an average particle size of at most 5 μm is less than 30%, the matrix of the resulting molded product tends to be not dense enough.

Further, when a metal hydroxide, a basic metal oxide or a complex oxide containing a basic metal oxide as a component, is used as a hardener, it is preferred that one having an average particle size of at least 20 μm is contained in an amount of from 0.1 to 10% of the entire hardener. If the hardener having an average particle size at least 20 μm, is contained in an amount of from 0.1 to 10%, when water contained in the hardenable composition is evaporated, it will readily be released to the exterior, whereby it is possible to suppress expansion of the matrix or formation of voids which is likely to be caused when evaporated water tends to be hardly released. Accordingly, the mechanical strength of the resulting organic molded product will be high. If the hardener having an average particle size at least 20 µm is contained even in a small amount, its effects can be obtained. However, if it is contained in an amount exceeding 10% based on the entire hardener, the matrix of the resulting molded product tends to be not dense enough.

In the present invention, urea is used to control the high reactivity between the acid metal phosphate and its hardener, contained in the hardenable composition.

When urea is added to the acid metal phosphate before mixing with the hardener or to a mixture of the acid metal phosphate and its hardener immediately after mixing, the two amino groups of urea and hydroxyl groups of the acid metal phosphate will interact with each other to suppress the reaction of the acid metal phosphate with its hardener, whereby an increase of the viscosity of the hardenable composition can be suppressed. As a result, the fluidity of the hardenable composition will not be impaired, and its impregnation to fibrous reinforcing material and molding into a desired shape can be facilitated.

Further, urea will not be decomposed until the temperature reaches a level of about 120° C. and will start to be decomposed when heated at a temperature higher than that level. Accordingly, even in a case where heating is carried out to complete hardening of the hardenable composition, urea suppresses the reaction of the acid metal phosphate with its hardener until the majority of water contained in the hardenable composition will be evaporated and released to the exterior, whereby it is possible to avoid a possibility that only the surface of the hardenable composition will be hardened, and expansion or formation of cracks due to evaporation of internal water can be suppressed, whereby the mechanical strength or appearance of the resulting inorganic molded product will not be impaired.

Further, in the present invention, the semi-rigid material obtained by molding the molding material prepared by combining the hardenable composition and the inorganic reinforcing material, into a desired shape, is heated at a temperature of at least 120° C. to complete the hardening. At this temperature, urea will be decomposed to ammonia and carbon dioxide by heat and will be released to the exterior, and thus it will not remain in the inorganic molded product. Accordingly, even when the inorganic molded product is subjected to a high temperature at a level of at least 400° C., there will be no such a possibility that an organic substance will be carbonized and remain in the inorganic molded product thereby to impair the strength or electrical properties of the inorganic molded product as in a case where an amine or the like is incorporated to the hardenable composition.

Furthermore, a part of ammonia formed by the thermal decomposition of urea will be captured by the acid metal phosphate contained in the hardenable composition and will accelerate hardening of the hardenable composition, whereby the heat resistance and water resistance of the resulting inorganic molded product will be improved.

In the present invention, urea is used in an amount of from 0.1 to 10 parts per 100 parts (as solid content) of the acid metal phosphate. If the amount of urea is less than 0.1 part, the reaction-suppressing effect of urea tends to be inadequate. On the other hand, if the amount of urea exceeds 10 parts, the amounts of ammonia and carbon dioxide formed by the decomposition of urea at the time of heating the hardenable composition for hardening, will increase, whereby voids will be formed in the resulting inorganic molded product, and its mechanical strength or the like tends to deteriorate. The amount of urea is more preferably from 0.5 to 8 parts per 100 parts of the acid metal phosphate.

The inorganic reinforcing material to be used in the present invention may be one which is similar to the reinforcing material which is commonly used for a conventional inorganic material. It is preferred to employ inorganic fibers or whiskers. Especially, from the viewpoint of common usage, it is particularly preferred to employ inorganic fibers. The inorganic fibers may, for example, be glass fibers, ceramic fibers or carbon fibers, and the whiskers may, for example, be aluminum borate whiskers.

The glass composition of the above glass fibers may, for example, be A glass, E glass, ECR glass, S glass or AR glass. The above mentioned ceramic fibers may, for example, be alumina fibers, silicon-alumina fibers or silicon nitride fibers.

The above inorganic fibers may be used in the form of short fibers or long fibers, and various types of inorganic fibers including inorganic fibers processed into a mat, woven fabric, non-woven fabric or paper, may suitably selected for use depending upon the method for processing of the hardenable composition or the particular application of the molded product. As the inorganic fibers, it is particularly preferred to employ glass fibers with E glass composition which are inexpensive and commonly employed. The glass fibers with E glass composition may be used in the form of short fibers such as milled fibers or chopped strands, continuous fibers such as yarns or rovings, or a processed product such as a mat, woven fabric or non-woven fabric.

The above inorganic reinforcing materials may be used alone or in combination as a mixture of two or more of them by suitably selecting the quality and the form. The inorganic reinforcing material is used in an amount of from 5 to 100 parts, per 100 parts (as solid content) of the hardenable composition. If the amount of the inorganic reinforcing material is smaller than 5 parts, the mechanical strength of the inorganic molded product tends to be inadequate. On the other hand, if the amount of the inorganic reinforcing material exceeds 100 parts, the composition tends to be insufficient relative to the reinforcing material, whereby the matrix tends to be coarse, and the mechanical strength of the inorganic molded product tends to be inadequate again. It is more preferred that the inorganic reinforcing material is used in an amount of from 15 to 80 parts per 100 parts of the hardenable composition.

Among the above mentioned inorganic reinforcing materials, alumina fibers, silicon-alumina fibers and whiskers are, for example, capable of reacting with the acid metal phosphate contained in the hardenable composition, and the wettability or adhesion with the matrix is relatively good, whereby surface treatment is not necessarily required. However, other inorganic reinforcing materials, particularly glass fibers and carbon fibers, have a relatively low reactivity with the acid metal phosphate, and they are preferably treated with a surface treating agent containing an epoxy resin. The epoxy resin has good compatibility with the acid metal phosphate and readily reacts with the acid metal phosphate. Accordingly, by applying a surface treating agent containing an epoxy resin to glass fibers or carbon fibers, the wettability and adhesion between the matrix and the glass fibers or carbon fibers will be improved, and the mechanical strength, etc. of the resulting molded product will be good.

The epoxy resin to be used for the surface treating agents may, for example, be an aromatic polyglycidyl ether type epoxy resin, an aliphatic polyglycidyl ether type epoxy resin or an aliphatic polyglycidyl ester type epoxy resin. Although there is no particular restriction, it is preferred to employ an aromatic polyglycidyl ether type epoxy resin from the viewpoint of the heat resistance of the surface treating agent, as the hardenable composition is heated for hardening. It is particularly preferred to employ a phenol novolac polyglycidyl ether type epoxy resin, a cresol novolac polyglycidyl ether type epoxy resin or a bisphenol A polyglycidyl ether type epoxy resin.

Further, with respect to a component other than the epoxy resin which is contained in the above surface treating agent, there is no particular restriction. However, the component other than the epoxy resin is preferably not thermoplastic, since the hardenable composition is heated for hardening. If a thermoplastic component is used, the surface treating agent imparted to the inorganic reinforcing material is likely to flow at the time of heating for hardening, whereby the adhesion at the interface between the hardenable composition and the inorganic reinforcing material is likely to be impaired. Preferred as the component other than the epoxy resin, of the surface treating agent, may, for example, be an epoxy-crosslinked polyvinyl acetate or urethane-crosslinked polyvinyl acetate.

The above surface treating agent is preferably applied in an amount of from 0.5 to 1.5% as a solid content, based on the mass of the inorganic reinforcing material having the surface treating agent applied thereto. If the amount of the surface treating agent applied, is less than 0.5%, no adequate effect for improving the wettability or adhesion between the hardenable composition and the inorganic reinforcing material tends to be obtained. On the other hand, if the amount of the surface treating agent exceeds 1.5%, no substantial further improvement in the adhesion at the interface tends to be obtained, and such will be economically disadvantageous.

In the present invention, various additives may be incorporated to the hardenable composition in an attempt to reduce the cost or the weight of the inorganic molded product or in order to impart a design feature to the molded product. Such additives may, for example, be light weight aggregates, fillers, or pigments. The light weight aggregates may, for example, be shirasu balloons, glass balloons or pearlite. The fillers may, for example, be silica sand composed mainly of acidic oxide, fumed silica, glass powder or clay. The pigments may, for example, be titanium oxide, zinc oxide, phthalocyanine, iron oxide red or mapico. These materials may be optionally selected for use and may be used in suitable amounts depending upon the particular purpose.

With respect to each step in the process for producing an inorganic molded product of the present invention, there is no particular restriction. However, a specific example may be given as follows.

First step: The acid metal phosphate aqueous solution, its hardener and urea are mixed to obtain a hardenable composition. At that time, various additives may be incorporated as the case requires.

Second step: The hardenable composition obtained in the first step and the inorganic reinforcing material are combined to obtain a molding material which will be molded into a desired shape in the next step. A method for combining the hardenable composition and the inorganic reinforcing material may be suitably selected from the following methods ① to ④, depending upon the molding method to be used in the next step or the particular application of the resulting inorganic molded product. However, the method is not limited to such exemplified methods.

① A method wherein a mat-shaped inorganic reinforcing material is used, and the mat-shaped reinforcing material is dipped in a bath of the hardenable composition, and the composition is impregnated and attached to the mat-shaped reinforcing material, while withdrawing the reinforcing material from the bath.

② A method wherein the hardenable composition is preliminarily made to have a high viscosity to some extent, and it is coated on the surface of a carrier material such as a resin film; on the coated composition, chopped strands obtained by cutting or preliminarily cutting rovings in a predetermined length, are scattered, followed by compressing by a compressing apparatus via a carrier material, to impregnate the composition to the reinforcing material.

③ A method of employing a hand lay up method or a spray lay up method as used for the production of a glass fiber-reinforced plastic, wherein instead of the plastic (resin) the hardenable composition is used.

④ A method wherein as the inorganic reinforcing material, short fiber form inorganic fibers such as whiskers, milled fibers or chopped strands, are used, and the hardenable composition and the inorganic reinforcing material are kneaded by means of a dispersion mixer such as a kneader.

In the above method ③, it is preferred to carry out combining the hardenable composition and the inorganic fibers as the inorganic reinforcing material on a mold having a desired shape, so that molding of the molded material can also be carried out.

Third step: This step is not essential, but the amount of water contained in the molding material is adjusted to be from 5 to 10%, based on the molding material, for the purpose of improving the handling efficiency of the molding material till the next step and preventing expansion of the molded product by abrupt vaporization of the internal water by suppressing the amount of water which evaporates at the time of molding or completing hardening. However, this step is not required, if it is possible to reduce the amount of water when the hardenable composition is prepared in the first step. Further, in a case where combining of the hardenable composition and the inorganic fibers, and the molding are carried out by the method ③ in the second step, it is preferred to release the molded product from the mold after drying the hardenable composition until most of water contained in the composition has been vaporized. To adjust the water content in the molding material within the above range, it is preferred to carry out drying by heating at a temperature of from 80 to 110° C. for from 2 to 8 hours.

Fourth step: The molding material is molded into a desired shape such as a board shape, a corrugated board shape or a concavo-convex shape, optionally set depending upon the particular application of the resulting molded product, to obtain a semi-rigid material. Such molding of the molding material can be carried out by an apparatus which is capable of exerting pressure only, or pressure and heating simultaneously, such as a pattern pressing apparatus, a flat plate pressing apparatus, a belt pressing apparatus or roll pressing apparatus. Further, the molding material obtained by the method ④ in the second step may be molded by a transfer molding method which is employed for the production of a glass fiber-reinforced plastic.

Fifth step: The acid metal phosphate and its hardener contained in the semi-rigid material obtained in the preceding step, are completely reacted to complete hardening to obtain an inorganic molded product. At that time, it is necessary to heat the semi-rigid material to a temperature of at least 120° C. so that urea will be decomposed and released to the exterior. It is preferred to heat the semi-rigid material in a heating apparatus of from 120 to 200° C. for from about 1 to 8 hours. If the semi-rigid material is heated at a temperature lower than 120° C., urea may remain in the interior of the semi-rigid material and will thereby hinder the reaction, whereby the hardening tends to be incomplete, and the water resistance and mechanical strength of the resulting molded product tends to be inadequate.

Now, the present invention will be described in further detail with reference to Examples. However, it should be understood that the present invention is by no means restricted to such specific Examples.

A hardenable composition having various materials blended as shown in Table 1 and an inorganic reinforcing material having a surface treating agent with a composition as shown in Table 2 applied as the case requires, were combined in the proportions as identified in Table 3 or 4 to obtain a sample of an inorganic molded product. In this manner, samples of inorganic molded products of Examples 1 to 16 and Comparative Examples 1 to 11 were prepared.

The above surface treating agent was applied to the surface of inorganic reinforcing material so that it will attach in an amount of 1% as a solid content, based on the mass of the inorganic reinforcing material having the surface treating agent applied thereto.

In the preparation of samples of inorganic molded products of Examples 1 to 13 and Comparative Examples 1 to 6, 10 and 11, chopped strands of inorganic fibers were used as the inorganic reinforcing material. In accordance with the following method, a molding material prepared by combining the hardenable composition and the inorganic fibers, was molded in a board shape and hardened to obtain an inorganic molded product.

Firstly, an acid metal phosphate, its hardener and urea were mixed by a dissolver to obtain a hardenable composition. Then, the hardenable composition was coated on the surface of a PET (polyethylene terephthalate) resin film as a carrier material, and the chopped inorganic fibers were scattered thereon. Further, a PET resin film having the above mentioned hardenable composition coated on its surface, was placed thereon so that the side having the composition coated, would be in contact with the inorganic fibers. Then, this assembly was inserted in a mesh belt pressing apparatus and compressed to impregnate the hardenable composition to the inorganic fibers and to combine them to obtain a sheet-shaped molding material. This molding material was heated and dried in a dryer at a temperature of 80° C. to adjust the water content in the molding material to be about 5% based on the molding material. By means of a flat plate pressing machine, this molding material was press-molded at a temperature of 120° C. under a pressure of 3.43 MPa for a pressing time of 5 minutes to obtain a semi-rigid material of board-shape. The semi-rigid material thus obtained was heated in a heating apparatus at a temperature of 200° C. for one hour to complete hardening, and then it was naturally cooled to obtain an inorganic molded product. However in Comparative Example 11, the semi-rigid material was heated at a temperature of 100° C. for one hour for hardening.

Further, in the preparation of samples of inorganic molded products of Examples 14 to 16 and Comparative Examples 7 to 9, aluminum borate whiskers having an average fiber length of 20 $\mu$m, or milled fibers of E glass having an average fiber length of 300 $\mu$m, were used as the inorganic reinforcing material. In accordance with the following method, a molding material prepared by combining the hardenable composition and the inorganic fibers, was molded in a board shape and hardened to obtain an inorganic molded product.

Firstly, a solid acid metal phosphate, its hardener, urea, an inorganic reinforcing material and a small amount of water, were kneaded by means of a kneader to obtain a molding material having the hardenable composition and the inorganic-reinforcing material kneaded. Here, the amount of water to be incorporated, was suitably adjusted to such a level where the obtained molding material would not flow in a naturally left to stand still condition, while watching the degree of kneading by the kneader. By means of a flat plate pressing machine, this molding material was press-molded at a temperature of 80° C. under a pressure of 3.43 MPa for a pressing time of 2 minutes to obtain a semi-rigid material of board-shape. The semi-rigid material thus obtained was dried in a dryer at a temperature of 80° C. for 8 hours and then heated in a heating apparatus at a temperature of 200° C. for one hour to complete hardening, and then it was naturally cooled to obtain an inorganic molded product.

TABLE 1

| Composition of a hardenable composition | | | Unit: Parts by mass (as solid content) | | | | | | | | | | | |
|---|---|---|---|---|---|---|---|---|---|---|---|---|---|---|
| | | Average particle | Composition | | | | | | | | | | | |
| | Components | size, etc. | 1 | 2 | 3 | 4 | 5 | 6 | 7 | 8 | 9 | 10 | 11 | 12 |
| Acid metal phosphate | Aluminum primary phosphate | | 100 | | | 50 | 100 | 100 | 100 | 100 | 100 | 100 | 100 | 100 |
| | Aluminum sesquiphosphate (as solid content) | | | 100 | 100 | 50 | | | | | | | | |
| Hardener | Wollastonite | 10 $\mu$m product | 3 | | 3 | 3 | 3 | 3 | 3 | 3 | 3 | | 3 | 3 |
| | | 4 $\mu$m product | | 2 | | | | | | | | 5 | | |
| | Magnesium oxide | 2 $\mu$m product | | | | 5 | | | | | | | | |
| | Zinc oxide | Third kind product | | | | 5 | | | | | | 5 | | |
| | Aluminum hydroxide | 50 $\mu$m product | | 5 | | 2 | | | 12 | | | | | |
| | | 10 $\mu$m product | 12 | 5 | | 15 | 12 | 12 | | 12 | 12 | 45 | 2 | 12 |
| | | 3.5 $\mu$m product | | | | | | | | | | | | |
| | | 1.0 $\mu$m product | 5 | | 20 | | 5 | 5 | 5 | 5 | 5 | | 5 | 5 |
| | Aluminum oxide | 60 $\mu$m product | | | | 10 | | | 70 | | | | | |
| | | 15 $\mu$m product | 30 | | | 20 | 30 | 30 | 30 | 30 | 30 | | 15 | 30 |
| | | 3.7 $\mu$m product | | 70 | | 70 | | | | | | 50 | | |
| | | 1.8 $\mu$m product | 70 | | 170 | | 70 | 70 | | 70 | 70 | 100 | 50 | 70 |
| | Polyaluminum chloride | Powder product | | | 2 | | | | | | | | 2 | |
| Reaction suppressing component | Urea | | 2 | 1 | 4 | 2 | 8 | 0.5 | 2 | 0 | 12 | 2 | 2 | |
| | Oxalic acid | | | | | | | | | | | | | 2 |

TABLE 2

Composition of the surface treating agent for inorganic fibers

| Components | Mass % |
|---|---|
| Epoxy resin (epoxy equivalent; 450 g/eg) | 5.0 |
| Epoxy-crosslinked polyvinyl acetate | 5.0 |
| Deionized water | 90.0 |

TABLE 3

Combining ratio of the composition and the reinforcing material in Examples
Unit: Parts by mass (as solid content)

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Hardenable composition | Composition 1 | | 100 | 100 | 100 | | | | | | 100 | 100 |
| | Composition 2 | | | | | 100 | | | | | | |
| | Composition 3 | | | | | | 100 | | | | | |
| | Composition 4 | | | | | | | 100 | | | | |
| | Composition 5 | | | | | | | | 100 | | | |
| | Composition 6 | | | | | | | | | 100 | | |
| | Composition 7 | | | | | | | | | | | |
| Inorganic reinforcing material | E-glass fiber chopped strands (length: 50 mm) | Surface-treated | 10 | 40 | 100 | 40 | 40 | 40 | 40 | 40 | | |
| | ECR-glass fiber chopped strands (length: 50 mm) | Surface-treated | | | | | | | | | 40 | |
| | S-glass fiber chopped strands (length: 50 mm) | Surface-treated | | | | | | | | | | 40 |
| | Alumina fiber chopped strands (length: 25 mm) | No surface treatment | | | | | | | | | | |
| | E-glass fiber milled fibers (average length: 300 μm) | Surface-treated | | | | | | | | | | |
| | Aluminum borate whiskers | No surface treatment | | | | | | | | | | |

| | | | Ex. 11 | Ex. 12 | Ex. 13 | Ex. 14 | Ex. 15 | Ex. 16 |
|---|---|---|---|---|---|---|---|---|
| Hardenable composition | Composition 1 | | | 100 | | | 100 | |
| | Composition 2 | | | | | | | 100 |
| | Composition 3 | | | | 100 | | | |
| | Composition 4 | | | | | | | |
| | Composition 5 | | | | | | | |
| | Composition 6 | | | | | 100 | | |
| | Composition 7 | | | | | 100 | | |
| Inorganic reinforcing material | E-glass fiber chopped strands (length: 50 mm) | Surface-treated | | | | 40 | | |
| | ECR-glass fiber chopped strands (length: 50 mm) | Surface-treated | | | | | | |
| | S-glass fiber chopped strands (length: 50 mm) | Surface-treated | | | | | | |
| | Alumina fiber chopped strands (length: 25 mm) | No surface treatment | 40 | | 20 | | | |
| | E-glass fiber milled fibers (average length: 300 μm) | Surface-treated | | | | | 30 | |
| | Aluminum borate whiskers | No surface treatment | | | | | 10 | 50 |

TABLE 4

Combining ratio of the composition and the reinforcing material in Comparative Examples
Unit: Parts by mass (as solid content)

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|---|
| Hardenable composition | Composition 1 | 100 | 100 | | | | | 100 | | | | 100 |
| | Composition 8 | | | 100 | | | | | 100 | 100 | | |
| | Composition 9 | | | | 100 | | | | | | | |
| | Composition 10 | | | | | 100 | | | | | | |
| | Composition 11 | | | | | | 100 | | | | | |
| | Composition 12 | | | | | | | | | | 100 | |

TABLE 4-continued

Combining ratio of the composition and the reinforcing material in Comparative Examples
Unit: Parts by mass (as solid content)

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|---|---|
| Inorganic reinforcing material | E-glass fiber chopped strands (length: 50 mm) | Surface-treated | 3 | 120 | 40 | 40 | 40 |  |  |  |  | 40 | 40 |
|  | ECR-glass fiber chopped strands (length: 50 mm) | Surface-treated |  |  |  |  |  |  |  |  |  |  |  |
|  | S-glass fiber chopped strands (length: 50 mm) | Surface-treated |  |  |  |  |  | 40 |  |  |  |  |  |
|  | Alumina fiber chopped strands (length: 25 mm) | No surface treatment |  |  |  |  |  |  |  |  |  |  |  |
|  | E-glass fiber milled fibers (average length: 300 μm) | Surface-treated |  |  |  |  |  |  |  | 3 | 120 |  |  |
|  | Aluminum borate whiskers | No surface treatment |  |  |  |  |  |  | 40 |  |  |  |  |

* In Comparative Example 11, the hardening temperature in Example 2 was changed to 100° C.

Further, as Comparative Example 12, a glass fiber-reinforced gypsum board was used as a sample; as Comparative Example 13, an asbestos slate board was used as a sample; as Comparative Example 14, a decorated asbestos slate board was used as a sample; and as Comparative Example 15, an alkali resistant glass fiber-reinforced concrete board was used as a sample.

TEST EXAMPLES

By the following methods, samples of Examples 1 to 16 and Comparative Examples 1 to 15 were evaluated. The results are shown in Tables 5 and 6.
Thickness and bulk density: Method of JIS A 5430
Bending strength: Method of JIS A 1408 (measured in an ordinary state, after heating in an atmosphere of 300° C. for 24 hours and after immersion in water of 15° C. for 24 hours.)
Water absorption: A sample was immersed in water of 15° C. for 24 hours, whereby the ratio of the increased weight by the immersion of the sample in water of 15° C. for 24 hours to the weight prior to the immersion, was calculated.
Dimensional change: A sample was heated in air of 60° C. for 24 hours, then immersed in water of 15° C. for 24 hours, then heated in air of 105° C. for 24 hours and then naturally cooled to room temperature. The change in length of the sample as between before and after such heating and immersion, was measured by a contact gauge, whereby the ratio of the change to the initial dimension was calculated.
Surface state: A sample was heated in an atmosphere of 400° C. for one hour, whereupon the surface state was visually inspected to see if cracking or warping resulted.

TABLE 5

Results of evaluation of products in Examples

| Items evaluated | Conditions | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Bulk density |  | 1.92 | 1.95 | 1.90 | 1.85 | 1.92 | 1.90 | 1.75 | 2.01 |
| Thickness (mm) |  | 3.2 | 3.2 | 3.2 | 3.2 | 3.2 | 3.2 | 3.2 | 3.2 |
| Bending strength (MPa) | Ordinary state | 70.5 | 75.0 | 70.0 | 58.5 | 72.0 | 61.4 | 56.8 | 85.3 |
|  | After heating in an atmosphere of 300° C. for 24 hours | 36.4 | 40.0 | 38.5 | 34.5 | 48.6 | 38.5 | 39.8 | 43.5 |
|  | After immersion in water of 15° C. for 24 hours | 62.7 | 73.5 | 64.3 | 52.6 | 64.8 | 53.5 | 52.3 | 74.2 |
| Water absorption (%) | After immersion in water of 15° C. for 24 hours | 8.7 | 6.5 | 7.3 | 8.2 | 5.6 | 9.2 | 5.6 | 6.7 |
| Dimensional change (%) |  | 0.03 | 0.02 | 0.02 | 0.02 | 0.02 | 0.02 | 0.03 | 0.02 |
| Surface state | After heating in an atmosphere of 400° C. for 1 hour | No change | No change | No change | No change | No change | No change | No change | No change |
| Items evaluated | Conditions | Ex. 9 | Ex. 10 | Ex. 11 | Ex. 12 | Ex. 13 | Ex. 14 | Ex. 15 | Ex. 16 |

TABLE 5-continued

Results of evaluation of products in Examples

| | | | | | | | | | |
|---|---|---|---|---|---|---|---|---|---|
| Bulk density | | 1.86 | 1.91 | 2.02 | 1.95 | 1.82 | 2.05 | 2.00 | 2.05 |
| Thickness (mm) | | 3.2 | 3.2 | 3.2 | 3.2 | 3.2 | 3.2 | 3.2 | 3.2 |
| Bending strength (MPa) | Ordinary state | 76.4 | 80.4 | 87.9 | 78.5 | 61.7 | 57.5 | 60.5 | 65.4 |
| | After heating in an atmosphere of 300° C. for 24 hours | 38.5 | 50.6 | 73.0 | 69.6 | 36.4 | 33.0 | 48.3 | 54.0 |
| | After immersion in water of 15° C. for 24 hours | 70.4 | 71.6 | 78.6 | 78.5 | 40.0 | 47.0 | 55.1 | 56.9 |
| Water absorption (%) | After immersion in water of 15° C. for 24 hours | 5.8 | 6.2 | 5.4 | 5.5 | 10.2 | 11.0 | 5.6 | 5.0 |
| Dimensional change (%) | | 0.02 | 0.01 | 0.02 | 0.03 | 0.02 | 0.04 | 0.04 | 0.04 |
| Surface state | After heating in an atmosphere of 400° C. for 1 hour | No change | No change | No change | No change | No change | No change | No change | No change |

TABLE 6

Results of evaluation of products in Comparative Examples

| Items evaluated | Conditions | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Bulk density | | 1.75 | | 1.44 | 1.35 | 1.85 | 1.90 | 1.95 | 1.56 |
| Thickness (mm) | | 3.2 | | | | 3.2 | 3.2 | 3.2 | 3.2 |
| Bending strength (MPa) | Ordinary state | 48.5 | | | | 47.3 | 56.4 | | 50.3 |
| | After heating in an atmosphere of 300° C. for 24 hours | 30.5 | | | | 32.5 | 24.3 | | 15.6 |
| | After immersion in water of 15° C. for 24 hours | 41.8 | *1 | *2 | *3 | 28.5 | 20.5 | *4 | 27.3 |
| Water absorption (%) | After immersion in water of 15° C. for 24 hours | 11.2 | | | | 18.5 | 24.8 | | 14.5 |
| Dimensional change (%) | | 0.05 | | | | 0.05 | 0.10 | | 0.05 |
| Surface state | After heating in an atmosphere of 400° C. for 1 hour | No change | | | | No change | No change | | No change |

| | Items evaluated | Conditions | Comp. Ex. 9 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|---|---|
| | Bulk density | | | 1.87 | 1.74 | 0.70 | 1.70 | 1.60 | 2.10 |
| | Thickness (mm) | | | 3.2 | 3.2 | 12.5 | 3.0 | 3.0 | 10.0 |
| | Bending strength (MPa) | Ordinary state | | 70.5 | 64.3 | 5.0 | 55.0 | 50.0 | 35.4 |
| | | After heating in an atmosphere of 300° C. for 24 hours | | 39.6 | 45.2 | *6 | Cracks formed | Cracks formed | Cracks formed |
| | | After immersion in water of 15° C. for 24 hours | *5 | 24.3 | 18.5 | *6 | 26.5 | 24.0 | 17.6 |
| | Water absorption (%) | After immersion in water of 15° C. for 24 hours | | 25.3 | 28.3 | 70.5 | 45.3 | 47.3 | 53.5 |
| | Dimensional change (%) | | | 0.12 | 0.25 | 0.20 | 0.10 | 0.12 | 0.11 |
| | Surface state | After heating in an atmosphere of 400° C. for 1 hour | | No change | No change | Cracks formed | Cracks formed | Cracks formed | Cracks formed |

*1 The molding material was so brittle that it was impossible to handle for molding.
*2 The semi-rigid material expanded at the time of heat hardening, and it was impossible to obtain the desired molded product.
*3 Numerous voids were observed on the surface and in the interior of the obtained molded product.
*4 Cracks in the obtained molded product were so many that the measurements were impossible.
*5 During drying of the semi-rigid material, cracks formed so many that the evaluation was impossible.
*6 Impossible to measure It is evident from Tables 5 and 6 that the inorganic molded products of Examples 1 to 16 obtained by the process of the present invention have high bending strength and small water absorption and dimensional change as compared with the inorganic molded products of Comparative Examples 1 to 11. Further, with the glass fiber reinforced gypsum board, the asbestos slate board, the decorated asbestos slate board and the alkali resistant glass fiber reinforced concrete board of Comparative Examples 12 to 15, the water absorption and the dimensional change is very large, and cracks form at the time of heating at a high temperature. Whereas with the inorganic molded products of Examples 1 to 16 according to the present invention, the water absorption and the dimensional change are small, and there is no change in the surface state even when heated at a high temperature.

In Comparative Examples 3, 8 and 9 wherein no urea was incorporated to the hardenable compositions, it was impossible to obtain a molded product which can be evaluated, or even if it is possible to obtain a molded product, the bending strength is low and the water absorption is large, as compared with the products of Examples of the present invention, i.e. the molded product was inferior in the mechanical strength and water resistance. This indicates the effect of the incorporation of urea.

Further, in a case where urea was incorporated to the hardenable composition in a range exceeding from 0.1 to 10 parts per 100 parts of the acid metal phosphate (Comparative Example 4), so many voids were observed in the molded product. This indicates that ammonia and carbon dioxide generated by the decomposition of urea were too much.

Further, with the molded product obtained by heating the semi-rigid material at a temperature of lower than 120° C. (Comparative Example 11), the bending strength is low and the water absorption is high, as compared with the molded product of Example 2. This indicates that if the heating temperature of the semi-rigid material is low, urea is likely to remain and hinder the hardening.

Further, with the molded product in a case where oxalic acid was used as a reaction-suppressing component instead of urea (Comparative Example 10), the bending strength after immersion in water is low, and the water absorption is high i.e. the water resistance is poor, as compared with the molded product of Example 2. This indicates that when a carboxylic acid is used as a reaction-suppressing component instead of urea, such a carboxylic acid will remain in the molded product and may present an adverse effect.

Further, in a case where the hardener is used in an amount departing from the range of from 80 to 200 parts per 100 parts of the acid metal phosphate (Comparative Examples 5 and 6) or in a case where the inorganic reinforcing material is used in an amount departing from the range of from 5 to 100 parts per 100 parts of the hardenable composition (Comparative Examples 1, 2 and 7), it is impossible to obtain a molded product which can be evaluated, or the bending strength of the obtained product is low, i.e. the mechanical strength of the molded product will be inadequate.

Further, when Example 2 or the like wherein a hardener having an average particle size of at most 5 μm is incorporated in an amount of at least 30% based on the entire hardener, is compared with Example 13 wherein a hardener having an average particle size of at most 5 μm, was not used, the former has higher bending strength. This indicates that when the hardener having an average particle size of at most 5 μm is used in an amount of at least 30% based on the entire hardener, the matrix of the molded product will be dense, and the mechanical strength of the molded product will be improved.

As described in the foregoing, in the present invention, urea is incorporated in a specific amount to the hardenable composition, whereby it is possible to avoid expansion of the composition during the heating for hardening to avoid formation of voids in the resulting molded product, and to avoid deterioration of the water resistance of the molded product.

Further, the inorganic molded product obtained by the process of the present invention, has excellent mechanical strength, water resistance, dimensional stability and heat resistance, as compared with conventional products. Accordingly, it can be used as a building material or a structural material or member. For example, it can be used as a heat insulating plate for a heat press molding apparatus, as an inner material or exterior material of a building such as a house, or as an external material for reforming a house.

Further, the inorganic molded product obtained by the process of the present invention may be used in the form of a molded product obtained by laminating it with other materials for integration. Other materials to be laminated, may, for example, be a foamed resin board such as a foamed polystyrene resin, a decorative sheet made of a synthetic resin such as a melamine resin sheet, wood material or a concrete board. When the inorganic molded product and other materials are to be laminated and integrated, a method of bonding the inorganic molded product and other materials by means of an adhesive, or a method wherein the molding material and the above mentioned other materials are laminated and in that state, press-molded to obtain a semi-rigid material, and this semi-rigid material is heated to complete the hardening, and at the same time, the other materials are bonded by the adhesive force of the hardenable composition contained in the semi-rigid material, may optionally be selected for use depending upon the particular purpose of the product or the nature of other materials to be selected.

What is claimed is:

1. A process for producing an inorganic molded product, which comprises a step of preparing a hardenable composition comprising 100 parts by mass of an acid metal phosphate, from 80 to 200 parts by mass of its hardener, and from 0.1 to 10 parts by mass of urea, a step of combining 100 parts by mass of the hardenable composition and from 5 to 100 parts by mass of an inorganic reinforcing material to obtain a molding material, a step of molding the molding material into a desired shape to obtain a semi-rigid material, and a step of heating the semi-rigid material at a temperature of at least 120° C. to complete hardening.

2. The process for producing an inorganic molded product according to claim 1, which further includes a step of adjusting the water content of the molding material to be from 5 to 10 mass % before molding it into a desired shape.

3. The process for producing an inorganic molded product according to claim 1, wherein the hardener contains at least one member selected from the group consisting of a metal hydroxide, a basic metal oxide and a complex metal oxide containing a basic metal oxide as a component, and having an average particle size of at most 5 μm, in an amount of at least 30 mass % of the entire hardener.

4. The process for producing an inorganic molded product according to claim 1, wherein the hardener contains at least one member selected from the group consisting of a metal hydroxide, a basic metal oxide and a complex metal oxide containing a basic metal oxide as a component, and having an average particle size of at least 20 μm, in an amount of from 0.1 to 10 mass % of the entire hardener.

5. The process for producing an inorganic molded product according to claim 1, wherein the inorganic reinforcing material is inorganic fibers or whiskers.

6. The process for producing an inorganic molded product according to claim 5, wherein the inorganic fibers are glass fibers or carbon fibers having a surface treating agent containing an epoxy resin applied thereto.

* * * * *